(12) United States Patent
Larsen

(10) Patent No.: US 11,247,515 B2
(45) Date of Patent: Feb. 15, 2022

(54) APPARATUS FOR WHEEL-MOUNTED WIRELESS MEASUREMENT OF TIRE PRESSURE AND METHOD FOR DOING THE SAME

(71) Applicant: Christopher Scott Larsen, Plymouth, MN (US)

(72) Inventor: Christopher Scott Larsen, Plymouth, MN (US)

( * ) Notice: Subject to any disclaimer, the term of this patent is extended or adjusted under 35 U.S.C. 154(b) by 292 days.

(21) Appl. No.: 16/278,684

(22) Filed: Feb. 18, 2019

(65) Prior Publication Data

US 2019/0270349 A1    Sep. 5, 2019

Related U.S. Application Data

(63) Continuation-in-part of application No. 15/360,968, filed on Nov. 23, 2016, now Pat. No. 10,365,176.

(60) Provisional application No. 62/633,582, filed on Feb. 21, 2018.

(51) Int. Cl.
B60C 23/04    (2006.01)

(52) U.S. Cl.
CPC ........ B60C 23/0479 (2013.01); B60C 23/041 (2013.01); B60C 23/0427 (2013.01); B60C 23/0442 (2013.01); B60C 23/0444 (2013.01); B60C 23/0474 (2013.01); B60C 23/0494 (2013.01)

(58) Field of Classification Search
CPC .............. B60C 23/0479; B60C 23/041; B60C 23/0427; B60C 23/0444; B60C 23/0494
See application file for complete search history.

(56) References Cited

U.S. PATENT DOCUMENTS

| | | | | |
|---|---|---|---|---|
| 2004/0113764 A1* | 6/2004 | Katou | ............... | B60C 23/0408 340/445 |
| 2005/0151375 A1* | 7/2005 | Cheung | ............... | H02K 7/1846 290/1 R |
| 2008/0018448 A1* | 1/2008 | Ghabra | ............... | B60C 23/0462 340/447 |
| 2009/0009312 A1* | 1/2009 | Toyofuku | ............ | B60C 23/0494 340/447 |
| 2009/0199629 A1* | 8/2009 | Matsumura | ......... | B60C 23/0442 73/146.4 |
| 2012/0235809 A1* | 9/2012 | Cantarelli | ........... | B60C 23/0452 340/445 |
| 2012/0286728 A1* | 11/2012 | Bella | ................... | H04B 5/0093 320/108 |
| 2017/0206446 A1* | 7/2017 | Lesesky | ................ | G07C 5/008 |
| 2017/0225526 A1* | 8/2017 | Tomakidi | ............ | B60C 23/0471 |
| 2019/0241029 A1* | 8/2019 | Li | ......................... | B60C 23/044 |

OTHER PUBLICATIONS

Kollegger et al.; A System-on-Chip NFC Bicycle Tire Pressure Measurement System; IEEE Xplore; 2017. (Year: 2017).*
Adam Fabio; Hackaday; Hacklet 117—NFC Projects; https://hackaday.com/2016/07/23/hacklet-117-nfc-projects/; Jul. 2016. (Year: 2016).*

* cited by examiner

Primary Examiner — Daniel J Colilla

(57) ABSTRACT

A tire parameter measurement method, device, and system of using the same are described herein. One method includes an inflatable tire and wheel assembly with an internally mounted pressure sensor apparatus, measuring pressure values, associating the sensor to an identification reader to receive the pressure values from the pressure sensor, and notifying a user of the measured pressure.

9 Claims, 6 Drawing Sheets

2

APPARATUS FOR WHEEL-MOUNTED WIRELESS MEASUREMENT OF TIRE PRESSURE AND METHOD FOR DOING THE SAME

RELATED APPLICATION

This application is a continuation of, and claims priority from U.S. patent application Ser. No. 15/360,968 (entitled WIRELESS MEASUREMENT OF INFLATABLE PRESSURE filed Nov. 23, 2016). This application also claims priority to U.S. Provisional Application Ser. No. 62/633,582 (entitled Apparatus for wheel-mounted wireless measurement of tire pressure and method for doing the same, filed Feb. 21, 2018) which is incorporated herein by reference.

TECHNICAL FIELD

The present disclosure relates to a method of measuring, recording, and tracking pressure and other parameters in an inflatable tire, and devices and systems of using the same.

BACKGROUND

Previous approaches to wirelessly measure pressure inside an inflatable device such as a tire generally require a battery to power the wireless transceiver mounted to the wheel. The battery has a finite useable life and must eventually be replaced. Previous approaches generally do not measure tire or wheel temperature or other parameters.

Previous approaches generally do not allow tracking or logging of measured values. Previous approaches are unable to confirm that a user has physically viewed the tire by being proximate to it.

Previous approaches generally do not allow tracking of test results to monitor for slow leaks or for user compliance with required test intervals. This can result in frequent known and/or unknown misuse or non-use among users, which may, result in different pressure than expected.

SUMMARY

A tire parameter measurement method, device, and system of using the same are described herein. A sensor apparatus may be mounted to a wheel that maintains a gas pressure within an inflatable tire. The sensor apparatus may comprise a sensor transducer, an antenna for wireless communication to an external reader device, and a control circuit configured to interpret queries from the reader device, communicate with the sensor transducer and respond to the reader device with data from the sensor transducer. The wireless communication between the sensor apparatus and the reader device may be NFC or UHF RFID. The wireless communications may also be encrypted. The sensor apparatus may obtain all necessary power from the reader device. The sensor apparatus may also contain a unique identification code. The reader device may also include a pressure transducer such that the reader device can subtract its ambient pressure from the pressure measured by the sensor apparatus in order to calculate a gauge pressure of the tire.

The sensor transducer capable of converting measured quantity into a sensible reading may reside inside the tire. The sensor transducer may measure a gas pressure inside the tire.

The sensor apparatus antenna may reside inside the wheel and tire assembly. The sensor apparatus antenna may also reside outside the wheel and tire assembly by passing at least one wire through a slot or hole in the wheel wherein the wire couples the antenna and sensor transducer. The slot or hole may be sealed with a patch or plug. The hole through which the antenna and sensor transducer are coupled may be the same hole where the valve stem used to inflate the tire passes through the wheel. The antenna may be held away from the wheel by a spacer that is nonconductive or RF absorbing.

Also described is a system for measuring parameters inside a tire is described, the system comprising a tire and wheel assembly that maintains a gas pressure, a sensor apparatus for measuring parameters within the tire and wheel assembly, and a reader device external to wheel and tire assembly that communicates with the sensor apparatus. The sensor apparatus may measure a gas pressure within the tire and wheel assembly. The communications between the sensor apparatus and reader device may be encrypted. The sensor apparatus may also obtain all required power for measurement and communication from the reader device.

Also described is a method for testing a pressure, comprising a wheel and tire assembly, a sensor apparatus, measuring parameters within the gas housing using the sensor apparatus, and wirelessly communicating these measured parameters to an external reader device to notify the user of pressure conditions inside the wheel and tire assembly. The method may identify a particular tire and wheel assembly using a unique identifier within the sensor apparatus. The method may also allow for the reader device to provide power for the sensor apparatus to measure parameters and communicate results.

DETAILED DESCRIPTION

Figure 1:
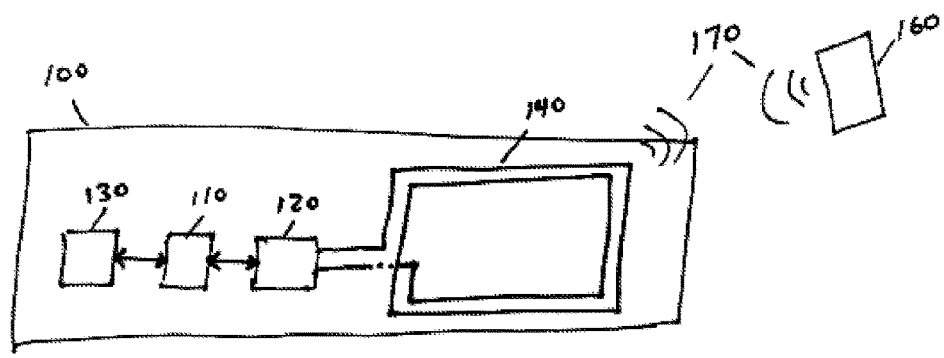
FIG. 1 illustrates a sensor apparatus according to an embodiment of the present disclosure.

A test method, device, and system of using the same are described herein. For example, one or more embodiments includes an inflatable tire mounted to a wheel that includes a sensor apparatus, measuring pressure values, associating the sensor to a reader device to transmit wireless power to the sensor apparatus, receiving the values from the sensor apparatus, and notifying a user of the measurements.

Testing an inflatable tire in accordance with embodiments of the present disclosure can measure and record the pressure, temperature, and/or other parameters inside the tire. As a result, the effect on pressure of changes in conditions (e.g. changing temperature) can be determined, various leaks within the inflatable tire can be detected, the measurements can be tracked, and data can be secured.

Pressure, as used herein, generally refers to gas or a substance in an inflatable tire. Pressures of interest in accordance with embodiments of the present disclosure include air, smoke, water, chemicals, as well as mixtures of these and other gas/substance forms.

While previous approaches for testing a pressure use manual gauges to break the seal of the inflatable tire, embodiments of the present disclosure can quantitatively test a pressure using a manufactured sensor apparatus. For example, an internal pressure sensor apparatus can provide an increased accuracy reading related to the pressure, the reading(s) can be tracked and/or recorded for record keeping purposes, and/or to monitor compliance among users, among other benefits.

The disclosed approach can be performed by any user with an appropriate wireless reader device such as a smartphone enabled with near field communication (NFC), or such as a ultra-high frequency (UHF) radio frequency identification (RFID) reader. The system can allow for tracking, secured data to prevent data tampering, temperature compensation, and external pressure compensation, with no requirement to break the pressure seal of the inflatable tire.

Individual human users may use the disclosed approach for spot checks of tire measurements when in a remote location, for example, away from their home base, company origin, or truck depot. In these situations, the human user may quickly check tire pressure and/or temperature without requiring an invasive pressure gauge to be attached to each separate tire in turn. The disclosed approach allows remote tire measurements without a physical connection between the reader device and the tire itself. Drivers or other human users may quickly measure the tire parameters by approaching it with the reader device. A sensor apparatus internal to the tire may harvest power from the reader device, use it to measure an internal pressure, temperature, and/or other parameter(s), and report the measured values back to the reader device. The human user testing the tire may measure the parameters for all tires on their vehicle within several seconds.

Some organizations may require a daily check of all truck tires to ensure they are operational. The requirements may be legal, such as in the case of the US Department of Transportation requirements for over the road truck drivers, or procedural, such as in the case of a truck driver employer or fleet owner. The disclosed approach allows not only checking, but proof of compliance that each tire has been checked. The relatively short-range nature of the approach guarantees that the driver is within viewing distance of the tire, so the approach provides documentation that the human user measuring has been in near proximity to the tire, and has likely not only checked its measurements, but has also been close enough to view the tire to inspect it for physical damage. This provides a useful record of tire safety checks for confirmation of compliance with required procedures. Recordings of measurements and other data about the measurements such as time and geographic location of when each measurement was taken may be logged to an internet-connected database. This database can be used by a trucking fleet or employer to track and document whether drivers are checking all tire positions on a regular basis.

In some embodiments, the disclosed approach may be used for automated checks of tire pressure. For example, a vehicle may drive through a special lane at a truck stop, depot, or other location where fixed reader devices power sensors internal to the tires and record measurements. In one embodiment, fixed reader devices or their associated antennas may reside on each side of the truck wheels in each axle position. In another embodiment, there may be one fixed reader device or antenna on each side of the truck that is able to power all wheel positions on that side of the truck. In another embodiment, there may be one reader that can read all the measurements of all wheel positions from one fixed position. In some embodiments, the truck may drive past the fixed reader(s) to position the wheel positions for the fixed reader.

In some embodiments, the disclosed approach may be used for central automatic tire pressure monitoring within the vehicle itself. In one embodiment, reader devices or antennas may be mounted near the wheel positions of the vehicle in order to record measurements from the tires during vehicle operation. In this embodiment, the vehicle may be monitored while driving.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of pressure sensors" can refer to one or more pressure sensors.

In some embodiments, a pressure sensor can be combined to include a radio frequency identification (RFID) Integrated Circuit (IC) as a identifier. The sensor apparatus may provide a unique identifier that can be used, for example, to track (e.g., via a computing system with a database) the condition of the inflatable tire pressure over time, among other functions. The identifier can be numeric, alphanumeric, identified by one or more symbols, or other suitable identification mechanisms that can allow one to be distinguished from another. This identifier can be used to, for example, track the dates on which a particular inflatable tire has had its pressure measured, the pressure values on those dates, the owner of the inflatable tire, and other useful information about the inflatable tire, as will be discussed in more detail herein.

In some embodiments, the sensor apparatus may have user-writeable memory that allows the user to record certain values to the sensor apparatus itself. The user-writeable memory can be used to, for example, record a serial number for the inflatable, to tie the inflatable serial number to the unique identifier of the sensor apparatus, or to record the number of times the sensor apparatus has been read back to the sensor apparatus. Recording the number of times the sensor apparatus has been read may be useful in developing an expiration model for the sensor such that it may only be read a certain number of times.

As discussed above, the sensor can be mounted within the inflatable tire to the wheel on which the tire is mounted such that the sensor may assess the air pressure changes (e.g., pressure leakage) inside the inflatable tire.

In some embodiments, the sensor can be molded within the body of the inflatable tire (e.g., on or near an inside surface of the inflatable tire). For example, the sensor can be molded into the rubber used to mold the body of the tire. In some embodiments, the sensor can be adhesively applied to an inside surface of the inflatable tire. In some embodiments, a small hole can be formed in the inflatable tire and the pressure sensor circuit assembly can be used as a patch for that hole. The pressure sensor transducer on the circuit assembly can be situated directly over the hole to allow pressure measurement.

In some embodiments, the sensor can be a patch adhered to the inflatable tire, for example with an adhesive. The sensor may act as a patch to seal the gas housing from leaking through the hole provided for the pressure sensor. In this way, the sensor can be applied to existing tires without removing the tire from the wheel. Only a small hole needs to be created, which the sensor can patch to prevent excessive leaking. When the sensor is applied, the pressure sensor transducer should be aligned to the hole to ensure the pressure present at the pressure sensor transducer is equal to the pressure in the gas housing.

In some embodiments, the sensors do not need to be active at all times, but only when pressure testing takes place. As such, these types of sensors can be low power sensors that can, for example, be provided internal to an inflatable tire, which can harvest power from a power source (e.g., an included battery, the reader device electromagnetic field, or other available power source) and provide a measurement output to the user or reader device, through a wireless or wired connection.

Since the sensor may require no internal power source such as a battery, some sensors that could be used to record measurements can be cost efficient and/or durable. In some instances, the sensor apparatus may sustain the entire life of the wheel or tire to which it is mounted. For example, by being able to quantify the efficacy of the pressure of the inflatable tire, a user can be able to know when the tire main casing or body has become ineffective at holding pressure and that it should be replaced. In some embodiments, the sensor apparatus may survive retread cycles of the tire casing, tracking the tire casing for its entire life, including one or more cycles of replacing the external tire tread.

In a wired connection, the inflatable tire or its mounting wheel can include a communication component (e.g., transceiver having a wired connection port) to allow communication to and/or from a reader. In a wireless connection, the inflatable wheel/tire assembly can include a communication component (e.g., wireless transceiver) to allow communication to and/or from reader.

FIG. 1 illustrates a sensor apparatus according to an embodiment of the present disclosure.

The embodiment of FIG. 1 includes a sensor apparatus 100 with a number of components thereon including a sensor control circuit 110 that may communicate with the sensor transducer 130 to request and/or receive measurements. The sensor transducer 130 may measure pressure, temperature, or other parameter(s). The sensor transducer is exposed to the pressure inside the inflatable tire and converts this pressure into a sensible value, such as a voltage, or a digital data output. The sensor control circuit 110 may interpret the sensor transducer output and communicate the interpreted values to a device such as a reader device that is outside of the inflatable tire.

The sensor transducer may experience harsh environments inside the wheel, including high and low temperatures, high pressures, and foreign matter such as dirt and liquids. The sensor transducer may be chosen to specifically withstand these environments. For example, in some embodiments the sensor transducer may be a pressure sensor that is gel-filled to allow full submersion in liquids. Commercially available gel-filled pressure sensor transducers exist for pressure measurement in the presence of liquids and may be used in some embodiments of the sensor apparatus.

In some embodiments, a tire may have tire sealant inside to stop small tire leaks. This sealant may enter the sensor transducer and block it from measuring the internal conditions in the tire, especially in the case of pressure measurement. To avoid this, a sensor sampling tube may be added to the sensor transducer that raises the pressure sampling point above the level of the sealant in the tire when the tire is at rest. The sampling tube may be a replaceable item that is serviceable on an occasional basis to replace it if it begins to become clogged with sealant or other debris.

The sensor control circuit 110 may include analog to digital conversions, communication modules, a processor and/or memory. The memory may include various types of information including unique identifier(s) enabling association of the sensor apparatus with a tire, truck, company, driver, etc, data and executable instructions for the sensor apparatus or reader device. In some embodiments, portions of the memory may be written by the user when the sensor is installed and provisioned. In some embodiments, portions of the memory may be written wirelessly with the reader device. User-writeable memory may be used to record things like serial numbers, tire type, company, mileage, driver name, and other parameters.

The sensor control circuit may execute instructions that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory and/or the processor may be located on the sensor control circuit 110 or off of the sensor control circuit, in some embodiments. In some embodiments, the sensor control circuit 110 can include a network interface. Such an interface can allow for processing executable instructions and/or data on another networked computing device, can be used to obtain information about the inflatable tires, users, or other useful information (e.g., from the manufacturer, site where inflatable tires are being used, etc.), and/or can be used to obtain data and/or executable instructions for use with various embodiments provided herein.

As discussed above, the sensor control circuit 110 can include one or more input and/or output interfaces (e.g., connection to the sensor transducer 130, connection to the power supply and communications circuits, etc.). Such interfaces can be used to connect the sensor control circuit 110 with one or more input and/or output devices.

A sensor power supply 120 may provide power to other sensor apparatus elements. The sensor power supply may derive its power from a battery or from harvesting methods such as harvesting of an electromagnetic field emitted from the reader device. In some embodiments, aspects the sensor power supply and the sensor control circuit may be combined. This may be useful in the case of RFID-like sensor assemblies since RFID generally harvests power and communicates responses via the same antenna. In some embodiments, the sensor control circuit 110 may communicate to the antenna through the sensor power supply circuit 120. In other embodiments, the sensor control circuit and the power supply may each have separate connections to the antenna to harvest power and communicate with the reader device.

The sensor apparatus 100 includes an antenna 140. The antenna may be used to collect electromagnetic energy from the reader device or from other nearby devices. The antenna may also be used to transmit and/or receive data to/from another device such as the reader device 160. Any suitable type or orientation of antenna can be used with respect to the embodiments of the present disclosure wherein the antenna can send and/or receive data and/or instructions from a remote device.

In some embodiments, the sensor apparatus and its components may be powered by a power source located within the inflatable tire (e.g., a battery as part of the sensor power supply 120 or connected thereto). However, as indicated above, in some embodiments, the sensor may function such that a power source may be optional. That is, components of the sensor apparatus may harvest power from a reader device or other source that is not part of the inflatable tire assembly (e.g., via antenna 140).

Harvesting power from the reader device 160 can, for example, include a user approaching and/or holding the reader device such that the reader device may be close enough to provide adequate electromagnetic power for a sensor apparatus (e.g., pressure sensor). The reader device may provide power to the sensor power supply 120, which may power the entire sensor apparatus. The reader device may then request a measurement from the sensor apparatus 100. The sensor control circuit 110 may then request a measurement from the sensor transducer 130 (e.g., requesting a pressure sensor measurement) and communicate the result via the antenna 140. In another embodiment, the sensor control circuit may simply pass messages and measurement requests from the reader device to the sensor transducer without the sensor control circuit creating any measurement requests of its own.

With regard to identification of the inflatable tire, in some embodiments, the sensor control circuit may include a unique identifier that may be connected to the inflatable tire and/or specific to the user for test result tracking. That is, each sensor apparatus may include a unique identifier that may be associated with a particular inflatable tire or user. In some embodiments, the sensor apparatus's unique identifier may be used as the unique identifier of the inflatable tire itself. The association between sensor apparatus identifier and inflatable tire and/or user may be stored within the sensor apparatus itself, within the reader device, or within a database that may be internet-connected.

For example, each inflatable tire can have a different unique identifier and the identifiers can be used to identify one from another. In some embodiments, the functionality of an identifier can be provided by data stored in the sensor control circuit 110 or sensor transducer 130 and transmitted via the antenna 140 to a remote device that is requesting the information.

In some embodiments, when the pressure test begins, the sensor can measure and/or communicate measurement (e.g. pressure or temperature) values to an external test system (e.g. a reader device 160). The measurement values can include measured absolute pressure inside the inflatable tire.

Figure 2:
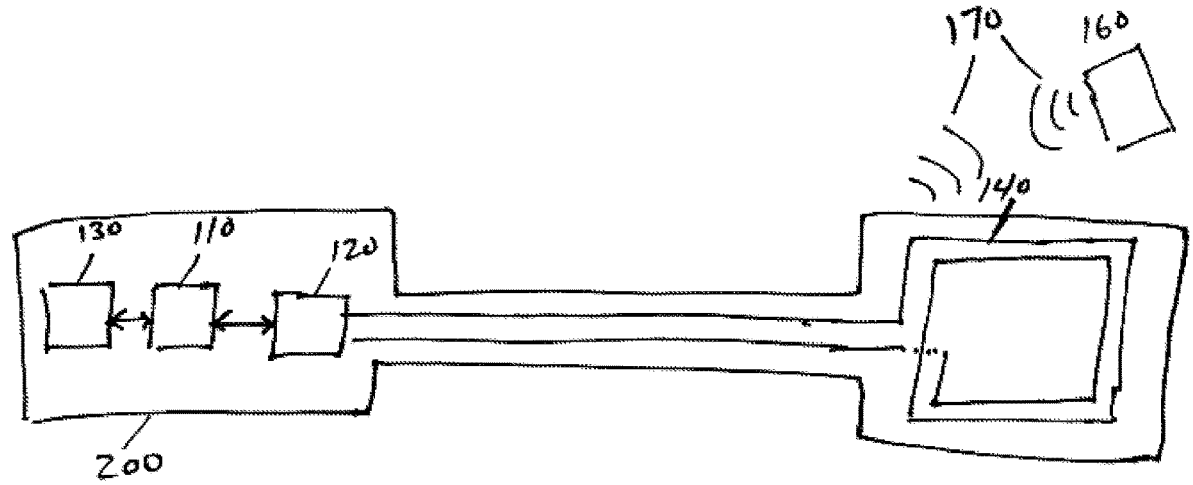
FIG. 2 illustrates a sensor apparatus with a remote antenna according to an embodiment of the present disclosure.

FIG. 2 illustrates a sensor apparatus with a remote antenna according to an embodiment of the present disclosure. The primary difference between the sensor apparatus in FIG. 1 and the sensor apparatus in FIG. 2 is that the antenna 140 is mounted at a distance from the sensor transducer 130. In this way, the sensor transducer may be mounted internal to the wheel/tire assembly, and the antenna may be mounted to the outside of the wheel/tire assembly such that a reader device may have easier access to the antenna. In this way, the reader device may communicate better with the sensor apparatus without requiring an electromagnetic reader field to be transmitted through the wheel/tire assembly. This may be important because most wheels and many tires contain conductive materials that will significantly attenuate or completely eliminate transmission of electromagnetic fields through their outer walls. In these cases, if the sensor antenna were inside of a metal wheel assembly, it may be impossible to power or read the sensor wirelessly. FIG. 2 allows for longer physical and electrical connections between the sensor transducer and the antenna so that the connections may pass through the wheel/tire assembly to allow the sensor transducer to be mounted inside the wheel/tire assembly, and the sensor antenna to be mounted outside the wheel/tire assembly.

FIG. 2 also includes the sensor control circuit 110, and the sensor power supply 120. These components may be mounted anywhere on the assembly since they generally do not need to be inside the pressurized wheel/tire assembly nor do they need to be mounted near the antenna as shown in the figure.

Figure 3:
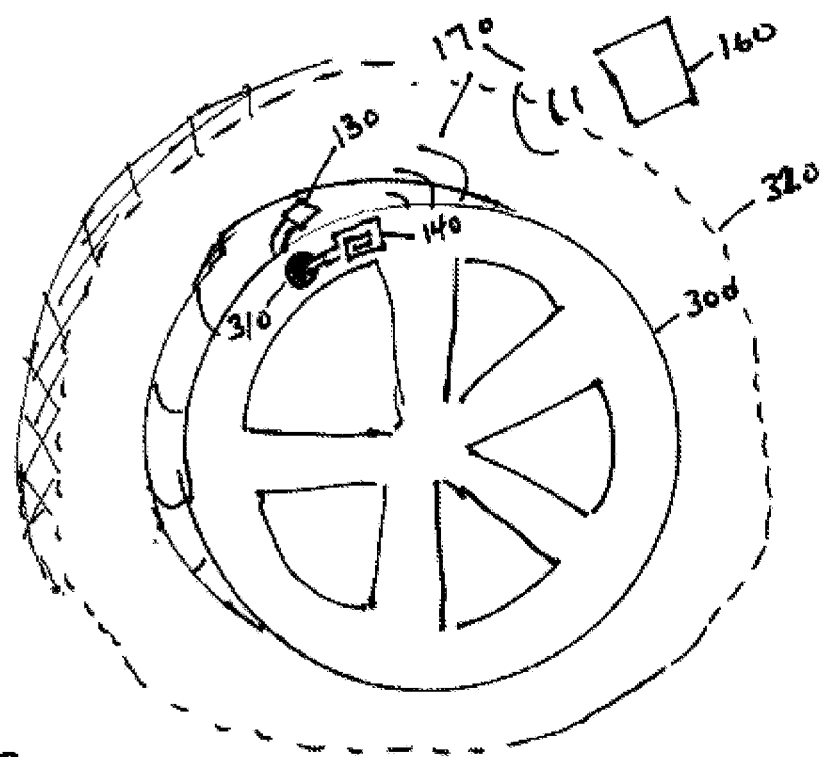
FIG. 3 illustrates a wheel with internal sensor apparatus according to embodiments of the present disclosure.

FIG. 3 illustrates a sensor apparatus 200 mounted to a wheel 300 in a wheel/tire assembly according to an embodiment of the present disclosure. Because wheels are generally made of conductive material (e.g. metal or carbon fiber), it is not a simple matter for a reader device to provide wireless power or to receive wireless information through a wheel. The conductive material serves to electromagnetically shield the sensor apparatus from the reader device, eliminating the power transfer and communication aspects. Likewise, the sensor transducer must be placed inside the wheel/tire assembly in order to accurately measure the tire pressure, temperature, or other parameter. In FIG. 3, the sensor antenna 140 is placed outside the wheel such that the conductive material of the wheel does not shield the sensor apparatus from the reader device. In some embodiments, the sensor antenna may be covered with a nonconductive material to protect it. This material may be a part of the wheel structure.

The sensor transducer 130 is placed in the interior of the wheel such that it can measure the tire parameters, such as pressure. Since the sensor control circuit 110 and sensor power supply 120 require neither access to the internal conditions of the tire nor wireless access to the reader, they may be inside or outside of the wheel. A slot or opening 310 in the wheel allows for power or communication wires to pass through the wheel to connect the elements of the sensor apparatus that reside outside the wheel to the elements that reside inside the wheel. The opening may be sealed after the sensor apparatus is installed to prevent air from escaping through the opening. In some embodiments, this opening may already exist in the wheel. For example, in some embodiments, the antenna may exit the inside of the wheel through the same opening as the tire valve stem. In some embodiments, the valve stem may include the antenna as a component.

In some embodiments, the reader device 160 can wirelessly power and communicate with the antenna without requiring electromagnetic transmission through a conductive wheel, as shown by 170.

Figure 4:
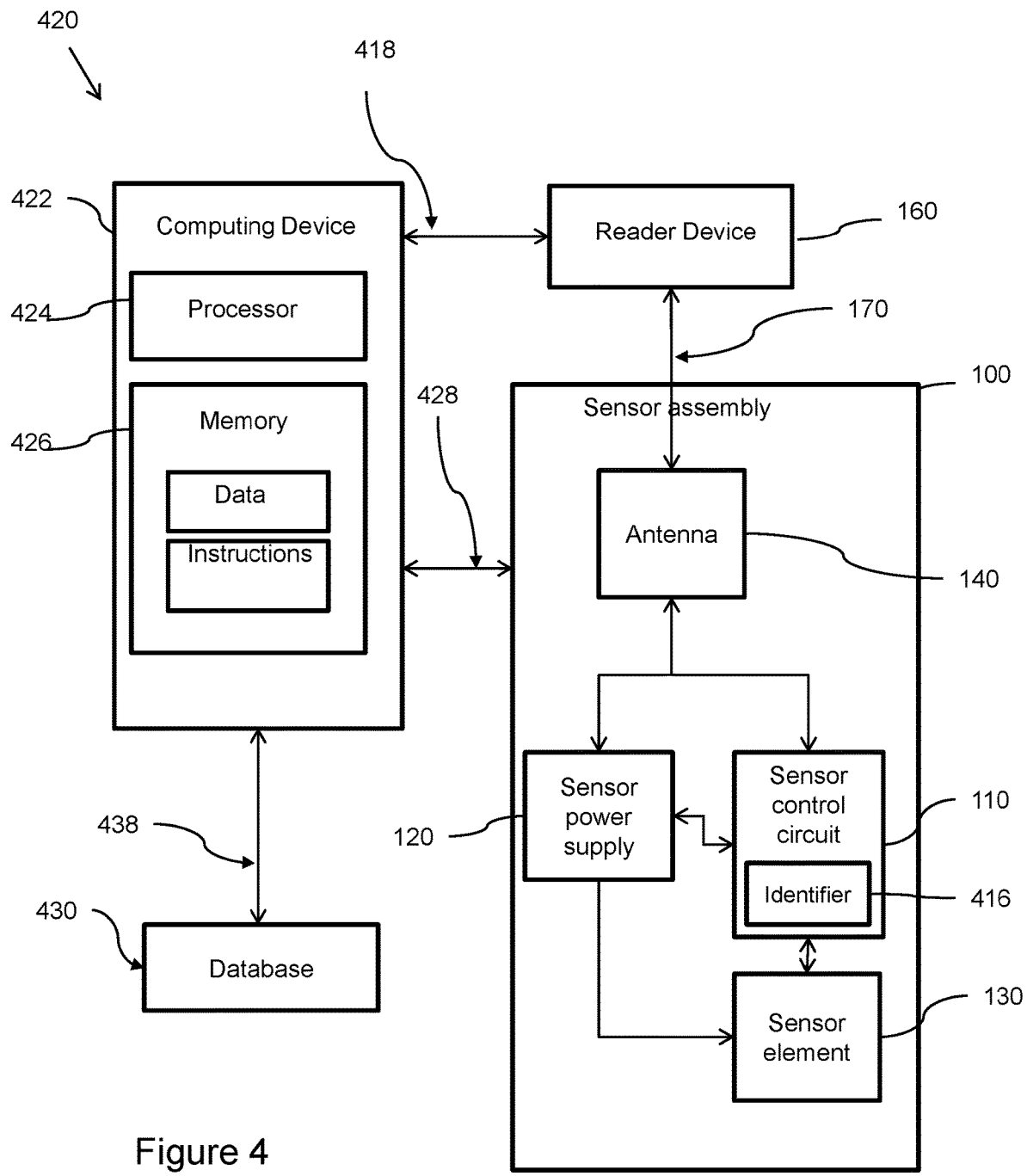
FIG. 4 illustrates a pressure measurement system according to an embodiment of the present disclosure.

FIG. 4 illustrates a measurement system according to an embodiment of the present disclosure. The measurement system 420 in the embodiment of FIG. 4 includes a sensor apparatus 100, a computing device 422, and a reader device 160.

The sensor apparatus 100 may be mounted inside a wheel/tire assembly. It may measure pressure and/or temperature or other parameters within the tire. Within the sensor apparatus, the antenna receives wireless power and communication 170 from the reader device. The sensor power supply 120 may be connected to the antenna 160 and may convert the received wireless power into useable power for the sensor control circuit 110 and sensor transducer 130. The sensor control circuit may also be connected to the antenna 140 in order to receive wireless communication and instructions from the reader device 160, and in order to respond to the reader device through antenna 140 and through the wireless communication and power 170. In some embodiments, the sensor control circuit may not be connected to the antenna and may instead communicate through the sensor power supply. This may occur, for example, in cases of backscatter communication such as RFID. In these cases, the sensor apparatus may communicate with the reader device by dynamically changing the loading on the antenna 140. The reader device may then measure the change in its own antenna loading and interpret this as communication.

Although the computing device 422 is shown as a different device to the reader device 160 and the sensor apparatus 100, in some embodiments, the reader device can include a computing device and can accomplish the functions of the computing device described herein without use of a separate computing device.

The sensor apparatus (100) may include a sensor transducer (130) that is exposed to the environment inside the tire. The sensor transducer takes measurements of one or more parameters and converts these measurements into a sensible value, such as a voltage. In some embodiments, the sensor transducer may measure pressure. In some embodiments, the sensor transducer may measure temperature. The sensor transducer may be connected to a sensor control circuit 110 that may interpret the sensor transducer output and communicate the pressure values outside of the wheel. The sensor control circuit may be connected directly to the antenna 140 to communicate wirelessly with the reader device 160. The identifier 416 may be a unique number or phrase assigned to the specific sensor apparatus for identification and may be a separate part or may be included in one of the other sensor apparatus components such as the sensor control circuit as shown in FIG. 4.

The computing device 422 may include a processor 424 and memory 426. The memory 426 may have various types of information including data, user-writeable memory, and executable instructions, as discussed herein.

The processor 424 can execute instructions that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 426 and/or the processor 424 may be located on the computing device 422 or off of the computing device 422, in some embodiments. In some embodiments, the computing device 422 can include a network interface. Such an interface can allow for processing executable instructions and/or data on another networked computing device, such as database 430, and can be used to obtain information about the sensor apparatus, the tire, the wheel, users, or other useful information (e.g., the manufacturer, site where sensor apparatus is being used, etc.), and/or can be used to obtain data and/or executable instructions for use with various embodiments provided herein.

As discussed above, the computing device 422 can include one or more input and/or output interfaces (e.g., connection to the reader device). Such interfaces can be used to connect the computing device 422 with one or more input and/or output devices (e.g., sensor apparatus 100 and/or reader 160, via communication links 428 and/or 418).

Other interfaces can include a display device (e.g., a monitor and/or a printer), among other suitable devices. The input/output interfaces can receive executable instructions and/or data, storable in the data storage device (e.g., memory), representing information about the sensor apparatus, the user, the environment in which the inflatable is being used, etc.

The processor 424 can execute instructions to provide information to a user of the computing device, such as pressure measurements of the tire, temperature measurements of the tire, identification and ownership information, projected life span of the tire, amount of gas leakage from the tire, comparison of multiple tires, and/or historical and/or predictive information based on the data received from the sensor apparatus 100.

The computing device 422 may also interface with a database 430 via communication link 438. The database may provide instructions to the computing device that are passed on to the sensor apparatus. For example, the database may request that the computing device reprogram the sensor apparatus to change its behavior. Likewise, the computing device may reprogram itself or the reader device based on instructions from the database. Communication via communication link 438 may be bidirectional, such that data from the sensor apparatus, reader device, or computing device is passed through to be stored in the database. For example, sensor apparatus readings may pass through the reader device and computing device and be stored in the database as a permanent record of measurements.

Such connectivity can allow for the input and/or output of data and/or instructions among other types of information. Some embodiments may be distributed among various computing devices within one or more networks.

As discussed herein, embodiments of the present disclosure can test a pressure using pressure sensors. The pressure sensors can detect the pressure of the wheel/tire assembly, which can determine whether a pressure is within a specified range. Utilization of the pressure sensors can provide accuracy when testing a pressure and/or tracking the test results.

The embodiment of FIG. 4 also includes a reader device 160. The reader device can be used, for example, to interrogate the sensor apparatus (100) within the wheel (via communication link 170) to request a measurement, determine a identifier 416, receive information about the status of the inflatable from the sensor control circuit 110 (e.g., a computing and/or communication device that receives, interprets, and communicates sensor data), and/or sensor information that can be used by executable instructions to provide analysis and other information such as: ownership information, projected life span of the tire, amount of leakage, comparison of multiple tires, and/or historical and/or predictive information based on the data received from the sensor apparatus 100. The reader can, for example, be a portable device such as a smart phone, or a desktop or mounted device that can be used to communicate information and, in some cases, provide power to the sensor as will be discussed in more detail below.

The received data can, for example, include a sensed pressure at a first point in time with a sensed pressure at a second point in time and the first and second data points are compared to determine a leakage rate and the leakage rate is compared to a threshold leakage rate. In some embodiments, the first and second data points can be compared to determine a leakage rate and the leakage rate is compared to at least one other leakage rate taken during a test at another time period to track the increasing leakage over time.

The status of the sensor apparatus can be evaluated periodically (e.g., at a set day or time of the month, whenever the tire is to be used, etc.). The evaluation can be accomplished in various suitable ways. For example, in some embodiments, the evaluation can be based on multiple sets of received data from the sensor apparatus to determine the status of the sensor apparatus, tire or wheel.

Another suitable use for the data received is to perform the evaluation based on multiple sets of received data from the sensor apparatus to project a possible failure timeframe for the tire or wheel. A time, for example, where it may no longer hold pressure for an adequately long time for its intended use. In some embodiments, such an evaluation can be based on multiple sets of received data from the sensor apparatus.

Data sent over the communication links as well as data stored both within the sensor apparatus and within the reader device and/or computing device can be encrypted or secured so it cannot be tampered with by users. By doing this, any user may securely take measurements, and the measurements may be trusted as an objective standard measurement. The encryption results in a minimal risk of malicious or deliberate data tampering by users or from inadvertent corruption by unwitting users.

Figure 5:
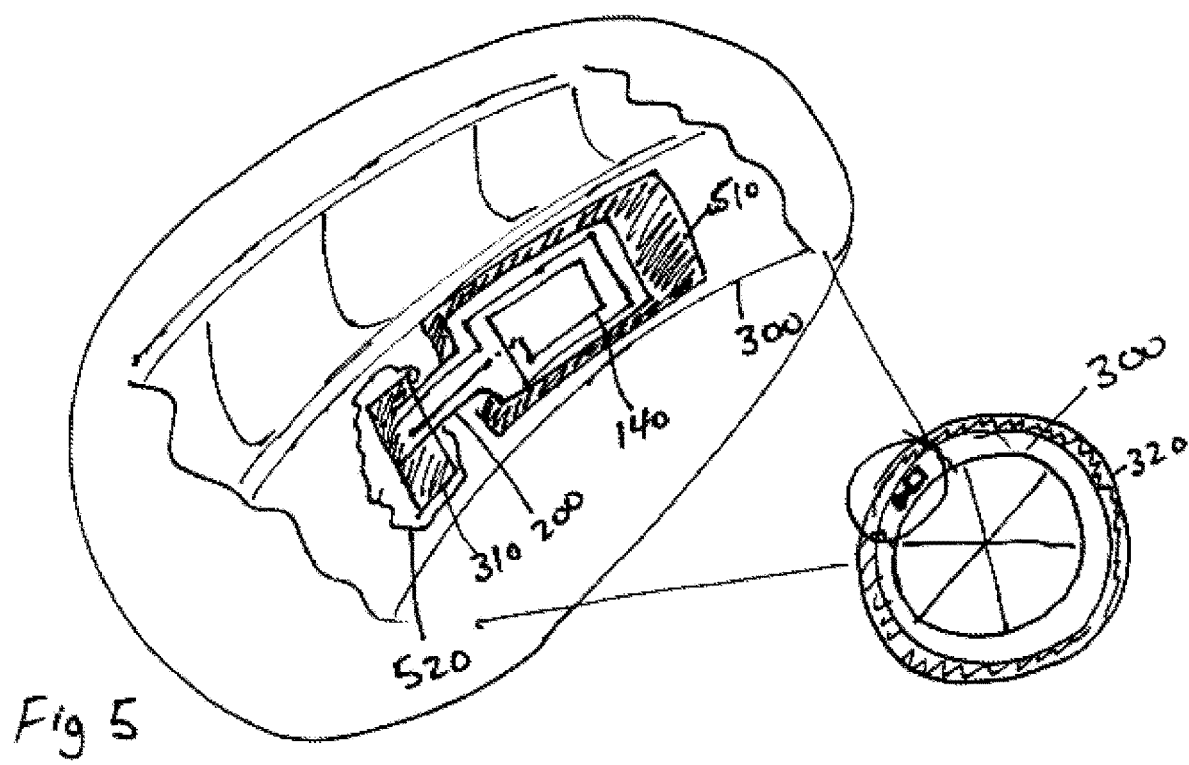
FIG. 5 illustrates a wheel with internal sensor apparatus, external antenna, antenna spacer material, and a patch or plug according to embodiments of the present disclosure.

FIG. 5 illustrates a cross section of a wheel with a sensor apparatus in accordance with an embodiment of the present disclosure. Mounting an antenna directly to a conductive substrate such as a wheel can significantly impact the transmitted and received signal strengths, even though the electromagnetic power transfer and communication do not need to go through the wheel. Lifting the antenna away from the substrate with a nonconductive material reduces the impact of the conductive substrate on transmission and reception strength. In some embodiments, this nonconductive spacer may be a part of the sensor apparatus, including the substrate on which the sensor apparatus is built. Spacers may also be made from special materials that selectively absorb the target frequency. These RF absorbers serve to shield the antenna from the conductive substrate, achieving improved transmission and reception signal strength per unit thickness as compared to a nonconductive spacer. By employing these RF absorbers, the spacer may be kept thinner and the antenna may be mounted closer to the conductive substrate.

FIG. 5 shows a sensor apparatus 200 mounted to a wheel 300. The inset shows the detail, and the larger view illustrates how the sensor is mounted to the wheel 300. The tire 320 is shown for clarity in the larger image, but not in the inset. The sensor antenna 140 is on the outside of the wheel, and the sensor transducer 130 is on the inside of the wheel. The sensor apparatus includes conductive wires or traces that connect the elements outside the wheel (e.g. sensor antenna 140, and possibly sensor control circuit 110 and sensor power supply 120) to the elements inside the wheel (e.g. sensor transducer 130, and possibly sensor control circuit 110 and sensor power supply 120). A spacer 510 is shown that lifts the antenna away from the conductive wheel substrate to improve its transmission and reception signal strength. The spacer 510 may be made from a nonconductive material (e.g. cardboard, plastic, wood, etc), or it may be made from a specific RF absorber such as part number 354001 from Wurth Electronics, which is tuned to absorb RF at 13.56 MHz, the frequency of near field communication, improving NFC communication and power transmission distance when used on conductive substrates.

FIG. 5 also illustrates a patch or plug 520 that seals the slot 310 that the sensor apparatus conductors pass through to connect the elements outside the wheel to the elements inside the wheel. The patch or plug 520 may be made of an elastomer in some embodiments and of the same material as the wheel such as carbon fiber in other embodiments. In some embodiments, the patch or plug may be a preexisting part of the wheel assembly. For example, in carbon fiber bicycle wheels, a hole may already exist as part of the manufacturing process that may have a premade plug. Aspects of the sensor apparatus may be integrated into this premade plug.

Figure 6:
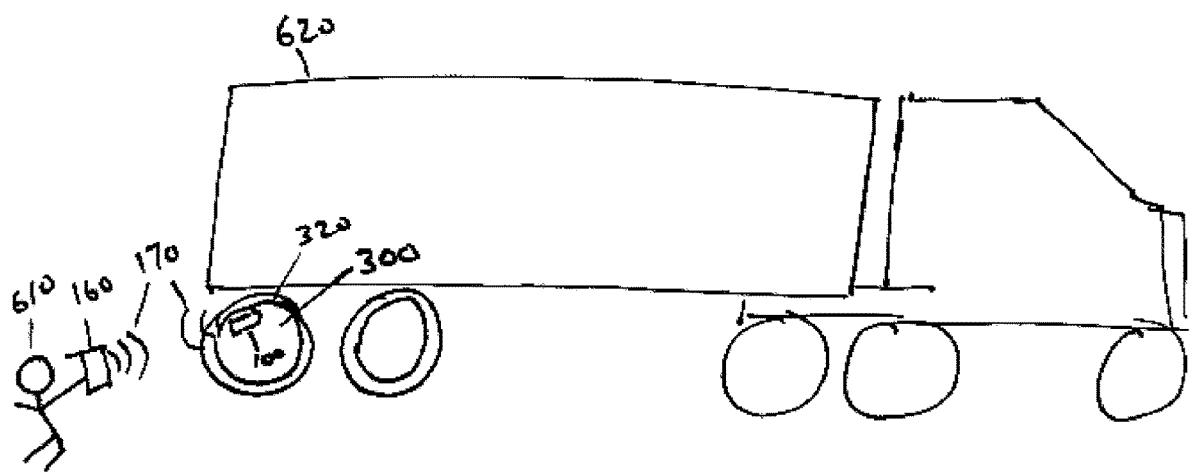
FIG. 6 illustrates a sensor apparatus installed in a vehicle wheel and read by a human user with a reader device according to an embodiment of the present disclosure.

FIG. 6 illustrates a sensor apparatus 100 installed in a vehicle wheel 300 and read by a human user 610 with a reader device 160 in accordance with an embodiment of the present disclosure. The vehicle 620 in this figure is a semi tractor trailer. The human user 610 may be a truck driver or other employee. The human user uses a reader device 160 to emit an electromagnetic field that transmits wireless power and communication signals 170 to power and communicate with the sensor apparatus 100 in one or more of the vehicle wheels 300. The communication range between the sensor apparatus and the reader device in such an embodiment may range from contact (~0 mm) to several meters. The reader device may keep a local or internet cloud-connected database record of measurements associated with unique identifiers from the sensor assemblies. Since the reading range is generally less than 2 meters, a valid reading implies that the user was within visual inspection distance of the wheel. Records of these readings with their associated data including time and location of reading may be used to ensure that users have actually checked the tires and wheels for pressure, temperature, and other visual information such as tire wear and tire and wheel condition. These checks may be legally required by various agencies or procedurally required by companies, and the records may be useful for compliance checks.

Figure 7:
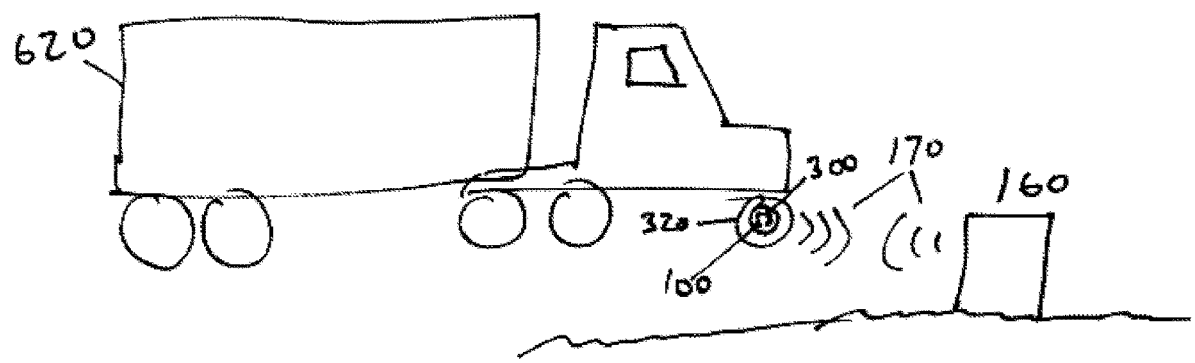
FIG. 7 illustrates a sensor apparatus installed in a vehicle wheel and read by a fixed reader device in accordance with an embodiment of the present disclosure.

FIG. 7 illustrates a sensor apparatus 100 installed in a vehicle wheel 300 and read by a fixed reader device 160 in accordance with an embodiment of the present disclosure. The vehicle in this figure is a semi tractor. A fixed reader may have access to mains power, and may therefore be able to transmit greater wireless power 170 to the sensor apparatus, increasing the possible read range for the sensor apparatus. In some embodiments, the read range may be several meters. With such a read range, the reader device may be able to read sensor assemblies in each wheel as the wheel drives past the reader device. In this way, it may be possible to measure values for large numbers of vehicles very quickly.

Figure 8:
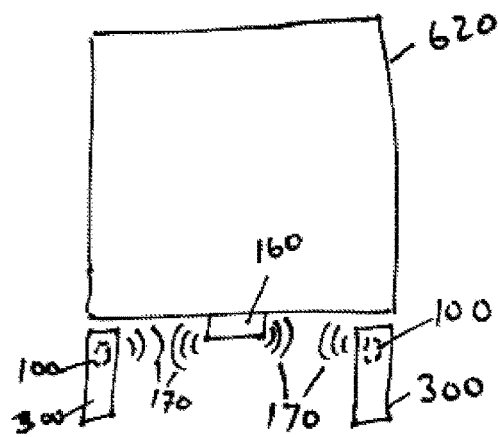
FIG. 8 illustrates a sensor apparatus installed in a vehicle wheel and read by a reader device fixed on the vehicle in accordance with an embodiment of the present disclosure.

FIG. 8 illustrates a sensor apparatus 100 installed in a vehicle wheel 300 and read by a reader device 160 fixed on the vehicle 620 in accordance with an embodiment of the present disclosure. The vehicle in this figure is a semi trailer as viewed from the back. In some embodiments, the reader device 160 may be powered from vehicle power and may be able to transmit greater wireless power 170 to the sensor apparatus, increasing the possible read range for the sensor apparatus. In some embodiments, the read range may be several meters. With such a read range, it may be possible for the reader device in some embodiments to read the sensor assemblies at a distance of several meters, allowing fewer reader devices to be installed on the vehicle.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above values and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A sensor apparatus, mounted to a wheel that maintains a gas pressure within an inflatable tire, the sensor apparatus comprising:
   a sensor transducer residing inside the tire, measuring parameters within the tire,
   an antenna that wirelessly communicates to a reader device external to the wheel, using a wireless communication protocol, and
   a control circuit configured to interpret queries from the reader device, communicate with the sensor transducer, and respond to the reader device with data from the sensor transducer,
   where the sensor apparatus obtains all necessary energy for measurement and communication via a wireless energy transfer from the reader device, and
   where the wireless communication protocol is near-field communication (NFC), and
   where the wireless energy transfer from the reader device is via near-field communication (NFC).

2. The sensor apparatus described in claim 1 where a gas pressure is measured by the sensor transducer.

3. The sensor apparatus described in claim 1 wherein the sensor apparatus includes a unique identification code.

4. The sensor apparatus described in claim 1 wherein the wireless communications are encrypted.

5. A system for measuring parameters inside a tire, comprising:
   a tire and wheel assembly comprising a tire mounted to a wheel that maintains a gas pressure; and
   a sensor apparatus comprising a sensor transducer for measuring parameters within the tire and an antenna that wirelessly communicates to a reader device external to the tire and wheel assembly; and
   a reader device external to the wheel and tire assembly that communicates with the sensor apparatus via the near-field communication (NFC) protocol and provides all necessary energy for the sensor apparatus measurement and communication functions via a wireless energy transfer via the near-field communication (NFC) wireless communication protocol.

6. The system of claim 5, wherein the sensor apparatus measures a gas pressure within the tire and wheel assembly.

7. The system of claim 5, wherein the communications between the sensor apparatus and reader device are encrypted.

8. A method for testing a pressure in a wheel and tire assembly with a sensor apparatus, comprising:
   measuring parameters within the gas housing using the sensor apparatus;
   wirelessly communicating these measured parameters to an external reader device to notify the user of pressure conditions inside the wheel and tire assembly;
   wherein the sensor apparatus obtains all necessary energy for measurement and communications via a wireless energy transfer from the reader device;
   wherein the wireless energy transfer and wireless communication take place via the near-field communication (NFC) protocol.

9. The method of claim 8, further comprising identifying a particular tire and wheel assembly using a unique identifier within the sensor apparatus.

* * * * *